J. M. CALKINS.
DIRIGIBLE LIGHTING APPARATUS FOR MOTOR VEHICLES.
APPLICATION FILED NOV. 7, 1917.
1,284,874.
Patented Nov. 12, 1918.
2 SHEETS—SHEET 1.
Fig. 1.
Fig. 3.
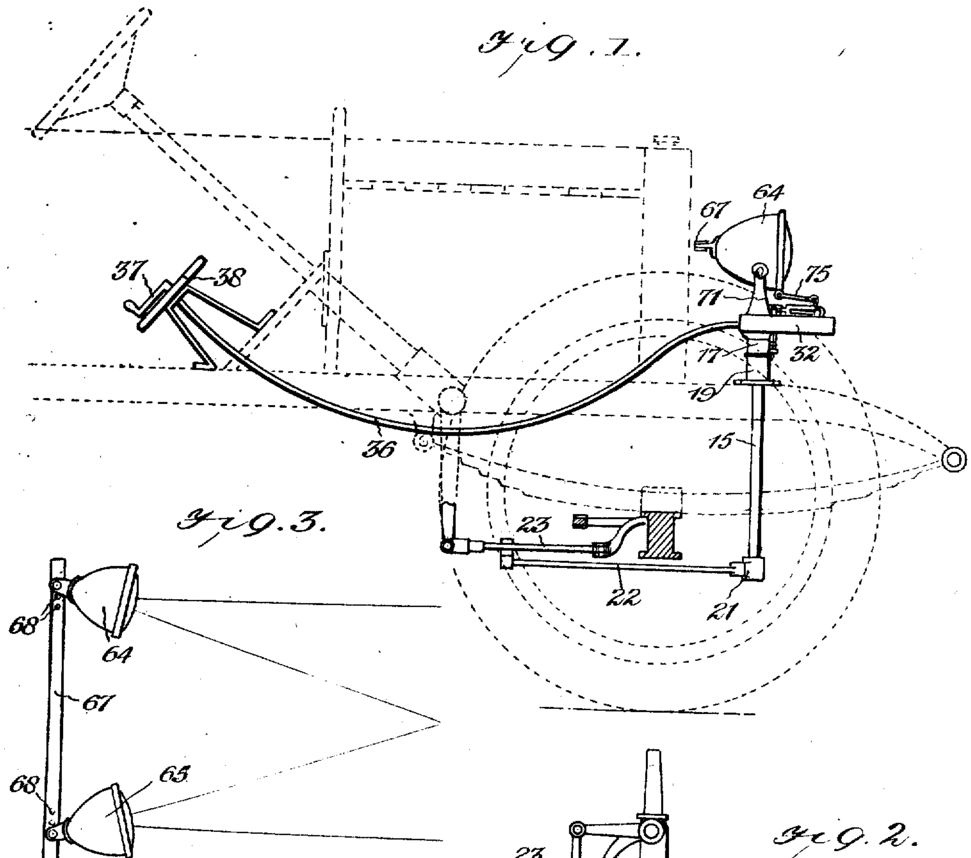
Fig. 2.
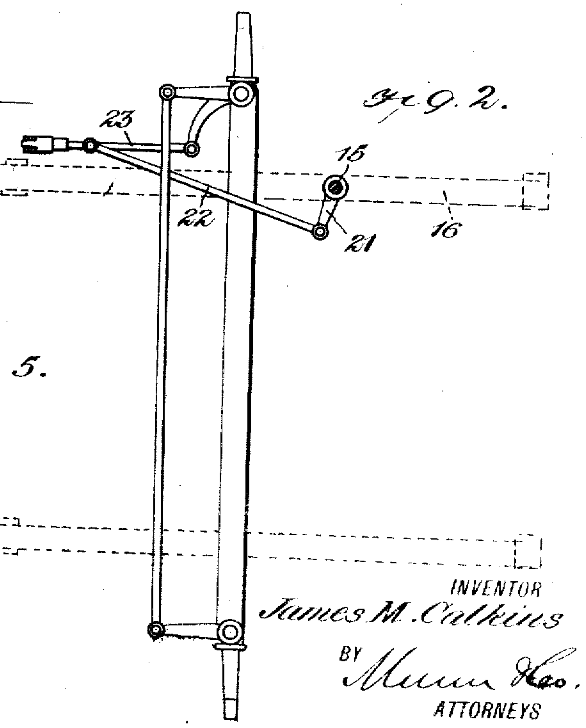
Fig. 4.
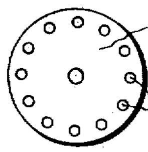
Fig. 5.
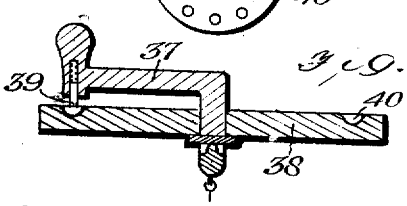
WITNESSES
*F. C. Barry*
*Myron S. Clear*
INVENTOR
*James M. Calkins*
BY *Munn & Co.*
ATTORNEYS J. M. CALKINS.
DIRIGIBLE LIGHTING APPARATUS FOR MOTOR VEHICLES.
APPLICATION FILED NOV. 7, 1917.
1,284,874. Patented Nov. 12, 1918.
2 SHEETS—SHEET 2.
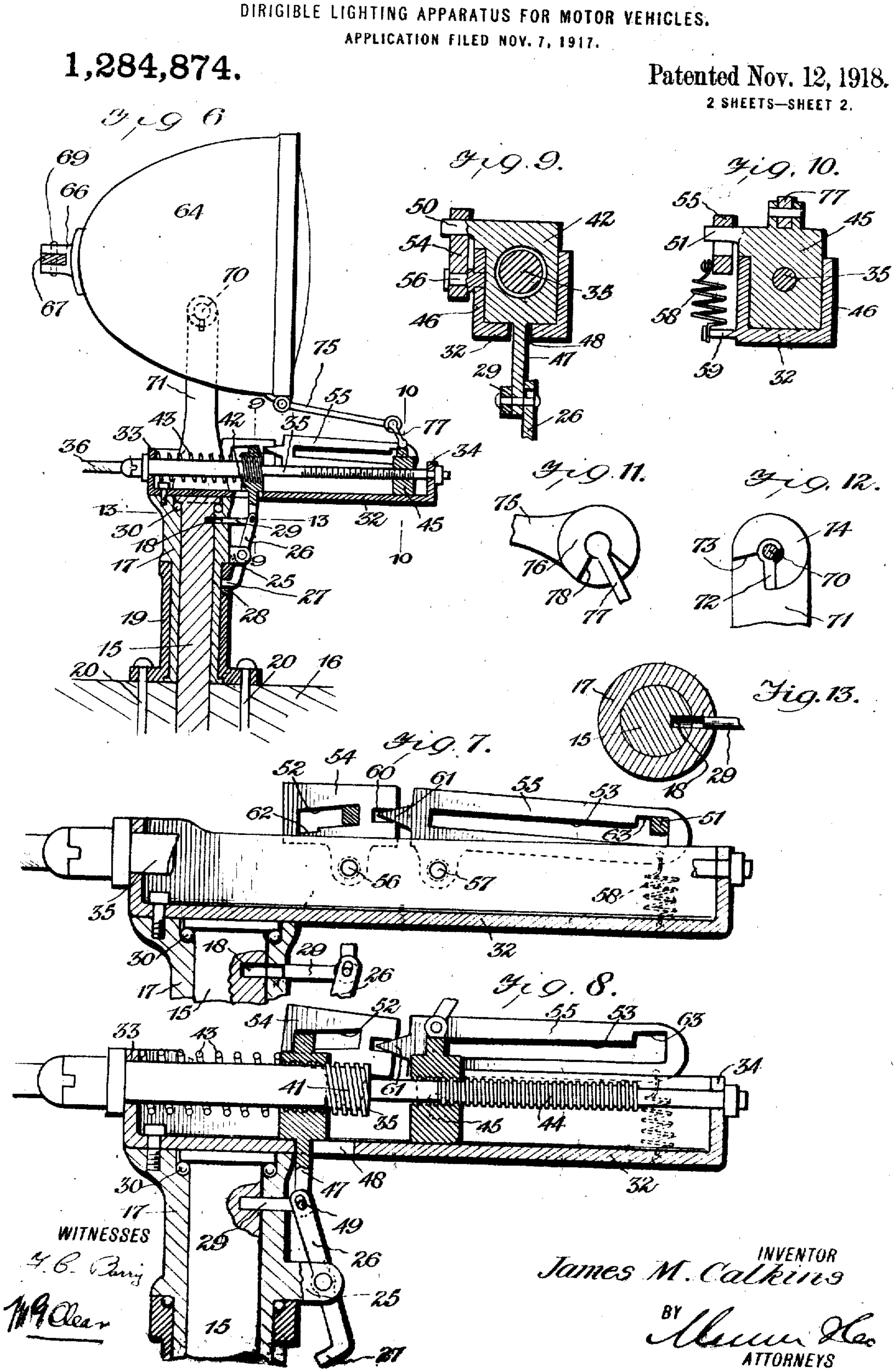
WITNESSES
INVENTOR
James M. Calkins
BY
ATTORNEYS

UNITED STATES PATENT OFFICE.

JAMES M. CALKINS, OF OAKLAND, CALIFORNIA.

DIRIGIBLE LIGHTING APPARATUS FOR MOTOR-VEHICLES.

1,284,874. Specification of Letters Patent. Patented Nov. 12, 1918.

Application filed November 7, 1917. Serial No. 200,760.

*To all whom it may concern:*

Be it known that I, JAMES M. CALKINS, a citizen of the United States, and a resident of Oakland, in the county of Alameda and State of California, have invented certain new and useful Improvements in Dirigible Lighting Apparatus for Motor-Vehicles, of which the following is a specification.

My present invention relates generally to the roadway lighting apparatus of motor vehicles, my invention comprehending the provision of a lighting apparatus of this nature which may be readily associated with the vehicle steering mechanism so that the light will be moved to the right or left, upon the turning of the front wheels of the vehicle, with the object of illuminating the roadway in advance of the machine.

My invention further comprehends the provision of a lighting apparatus for motor vehicles which may be tilted vertically toward and away from the roadway at any desired angle, with the object of preventing the glare of said light from blinding the view and endangering the safety of any vehicle or persons traveling in a direction opposite to that of the vehicle having the light, and whereby the lighting apparatus may be moved to the right or left with the light thrown toward the roadway at any desired angle with respect thereto.

My invention further comprehends the provision of a lighting apparatus wherein the above movements thereof are controlled at will by the operator of the motor vehicle through mechanisms extending from a point convenient to the operator to the said lighting apparatus.

In the accompanying drawings illustrating my invention,

Figure 1 is a diagrammatic side view illustrating my invention in operative relation with a motor vehicle.

Fig. 2 is a horizontal sectional view of a diagrammatic nature.

Fig. 3 is a plan view of the two lamps with their adjustable connections.

Fig. 4 is a plan view of the operator's dial.

Fig. 5 is a sectional view therethrough.

Fig. 6 is a side view, partly in elevation and partly in section, of one of the lamps and its support.

Fig. 7 is an enlarged view of a portion of Fig. 6 with the parts in locked position.

Fig. 8 is a view similar to Fig. 7 with the parts in released position.

Fig. 9 is a vertical transverse section taken substantially on line 9—9 of Fig. 6.

Fig. 10 is a vertical cross section taken substantially on line 10—10 of Fig. 6.

Fig. 11 is a detail fragmentary view illustrating the connection of certain of the lamp controlling arms.

Fig. 12 is a detail sectional view illustrating the connection of one of the lamps, and Fig. 13 is a detail horizontal section taken substantially on line 13—13 of Fig. 6.

Referring now to these figures, and particularly to Figs. 1, 2, and 6, my invention contemplates the provision of a vertical rotatable rod or post 15 journaled vertically through an opening in one of the bars 16 forming the chassis of the vehicle in connection with which my invention is to be utilized, the upper portion of this post above the bar 16 being rotatable in a sleeve 17, the latter of which is counter-bored at its upper end to receive the enlarged upper end of the said post and also provide for the reception of anti-friction balls 30 upon which the said post may under certain conditions rotate with respect to the sleeve 17, the latter being held stationary.

The lower reduced portion of the sleeve 17 is journaled within an upright tubular bracket 19, the lower flanged end of which rests upon, and is secured t , the bar 16 by bolts or other connections 20, as best seen in Fig. 6.

To the lower end of the upright post 15 as most clearly seen in Fig. 1, an arm 21 of any desired shape is secured, and pivotally connected by means of a connecting rod 22 of Figs. 1 and 2, to the steering arm 23 connecting parts of the steering mechanism of the vehicle, so that as the front wheels are shifted to steer the vehicle, similar movement will be imparted through the connecting rod 22 and arm 23 to the post 15, to rotate the latter upon its vertical longitudinal axis.

Inasmuch, however, as motor vehicle constructions vary to a considerable extent, it is to be understood at this point that any suitable connection may be provided between the post 15 and the steering mechanism to bring about the movement just above described.

Referring again to Fig. 6, it will be noted that the upper enlarged portion of the sleeve 17 has a laterally projecting ear 25 to which is intermediately pivoted a lever 26, the latter extending in a vertical direction and having a lower angular extremity 27 adapted to enter an opening 28 of the tubular bracket 19, in order to lock the sleeve 17 against rotation.

The upper end of the lever 26 has a laterally projecting pivoted arm 29, the free end of which normally projects within an opening in the upper portion of the sleeve 17 and is movable through the same, into and out of a recess 18 of the post 15, arm 29 being shiftable inwardly when the angular end 27 of lever 26 is withdrawn so that when the sleeve 17 is free for rotation, it will be locked in connection with the post 15 and will be rotated by the latter.

Rigidly fastened to the upper end of the sleeve 17 above the upper enlarged end of the post 15, is a horizontally disposed bracket 32 at the opposite ends of which are vertically projecting flanges 33 and 34 forming bearings for the opposite ends of a shaft 35, one end of which latter is connected to a flexible shafting 36 leading, as best seen in Fig. 1, to a point adjacent the driver's seat of the motor vehicle in connection with which my improved lighting apparatus is utilized, and to a controlling handle 37 which as best seen in Fig. 5, is rotatable in respect to a dial plate 38 and has a spring controlled plunger 39 arranged to enter the recesses 40 of an annular series provided in one face of the dial 38, to maintain the controlling arm 37 in adjusted position.

The shaft 35 above referred to, and as particularly seen in Fig. 8, is provided with an intermediate threaded portion 41 extending through a longitudinally shiftable block 42, between which and the flange 33 at one end of the bracket 32, is compressed a coil spring 43, disposed around the inner portion of the shaft 35. Forwardly beyond the threaded portion 41, the shaft 35 is materially reduced and provided upon its reduced forward portion with a series of threads 44, this reduced portion of the shaft extending through a longitudinally shiftable block 45.

The sides 46 of the bracket 32, as seen in Figs. 9 and 10 in particular, form a substantially rectangular structure which the sides and base of the blocks 42 and 45 movably interfit so as to prevent rotation of these blocks, whose bores are threaded to conform to the threads of the shaft portions 41 and 44, block 42 having a rigid arm 47 depending through a longitudinally slotted opening 48 of the bracket 32 and pivotally connected by a movable pivot 49 with the upper end of the lever 26 before described, so that outward movement of the block 42 to the position shown in Fig. 6, will lock the sleeve 17 against rotation and at the same time disconnect the same from the post 15, while inward movement of block 42 to the position shown in Fig. 8, against the tension of spring 43, will shift the lever 26 and release the sleeve 17 from the tubular bracket 19, at the same time coupling the sleeve with the post 15.

As seen particularly in Figs. 9 and 10, the upper portions of the blocks 42 and 45 have laterally projecting rigid arms 50 and 51, respectively, entering the longitudinal slots 52 and 53 of a pair of rocking levers 54 and 55. These levers are respectively pivoted at 56 and 57 to one side 46 of the bracket 32, and the outer end of the lever 55 is engaged by the upper end of a spring 58, the lower end of which is attached to a pin 59 extending from the bracket 32, as seen in Fig. 10, to normally thrust the inner end of the lever 55 upwardly.

The outer end of the lever 54 has a recess 60 as seen in Figs. 7 and 8, into which loosely projects the tapering inner extension 61 of lever 55, lever 54 having a recess 62 at the lower inner end of its slot 52, and lever 55 having a recess 63 at the outer upper end of its slot 53, the functions of which will be presently described.

It is to be understood that the foregoing mechanism including the bracket 32 and its several parts, is incident to but one lamp 64 of the pair of lamps 64 and 65, as seen particularly in Fig. 3, the latter of which may be mounted in any suitable manner and is to be connected to the lamp 64 in such manner as to move simultaneously therewith in the adjustment of the latter, each of these lamps having a rear slotted bracket 66 rigid therewith and pivotally connected to one end of a lamp connecting arm 67 extending therebetween, the arm preferably having a series of openings adjacent opposite ends as indicated at 68 in Fig. 3, through the various openings of which the pivot pins 69 are adapted to extend so that the lamps may in their normal position extend either in parallel or angular planes so as to direct the beams of light therefrom either parallel to one another or in convergent or divergent relation, as desired.

The lamp 64 has side trunnions 70 journaled in the upper bearings of an upright fork 71 of the bracket 32, each trunnion 70 having a depending lug 72 as seen particularly in Fig. 12, whose movement is limited within a segmental recess 73 of the upper bearing 74 of the fork 71 so that the lamp may thus be tilted vertically to throw its beam at various angles with respect to the roadway surface.

The lamp 65 is, of course, mounted in a generally similar manner so that it may tilt vertically with the lamp 64 through the connecting arm 67, and the lamp 64 has at its lower forward portion, an arm 75 pivotally connected at one end thereto and provided at its opposite end with a bearing 76, as seen in Fig. 11, for one end of a link 77 having a limited movement within a segmental recess 78 of the bearing 76, the opposite end of link 77 being pivotally connected to the upper portion of the block 45 as seen in Figs. 6 and 10.

Thus, bearing in mind that the pivotal connections of the arm 75 with the lamp 64 and with the link 77 are sufficiently tight to prevent vibratory movement of the lamps and their accidental displacement, it is obvious that with the parts in the locked position shown in Fig. 6, rotation of the controlling arm 37 by the operator serves to rotate the shaft 35 which will shift blocks 42 and 45 inwardly, and it is to be observed that in this movement block 42 moves considerably faster than the block 45, by virtue of the enlarged threads 41 of greater pitch than the threads 44. Thus before the rigid arm 51 of block 45 reaches the inner end of recess 63, arm 50 of block 42, moving in the inclined slot 52 of lever 54, will shift the latter lever upon its pivot 56, elevating its inner end and forcing its outer end downwardly which, by virtue of the engagement of the extension 61 of lever 55 within recess 60, will force the inner end of lever 55 downwardly and raise its outer end against the tension of spring 58 so as to release the arm 51 from the recess 63, moving lever 55 to the position shown in Fig. 8 so that the block 45 will be free for movement throughout the length of the slot 53. As the blocks 42 and 45 continue to move inwardly with the parts in the position shown in Fig. 8, block 42 moves against the tension of its spring 43, and said blocks upon reaching the inner end of the relatively short slot 52 of lever 54, and at a greater speed than the block 45, will soon reach the recess 62 and will enter the latter as it moves off the inner ends of the threads 41, so that with the lever 26 in the position shown in Fig. 8, sleeve 17 will be coupled to the post 15 and released from the tubular bracket 19, and thus permit the lamps 64 and 65 to rotate upon vertical axes, simultaneously with, and to follow, shifting movements of the steering mechanism of the motor vehicle.

It will be observed that during the time the parts are in the position shown in Fig. 8, block 45 will be free to shift inwardly and outwardly under manual control of the operator to raise and lower the light beams, as desired, and that when the parts are to be again locked as in Fig. 3, block 45 is first shifted outwardly by rotation of the controlling arm 37, until it reaches the inner end of the recess 63, upon which spring 58 rocks lever 55 whose connection by virtue of extension 61, with the lever 54, also rocks the latter so as to free the arm 50 of the block 42, which latter being urged outwardly by the spring 43, at once reëngages the threads 41 and is shifted outwardly with final outward shifting movement of block 45, to withdraw the arm 29 from the recess 18 of the post 15 and at the same time move the angular end 27 of lever 26 into the recess 28 of the stationary tubular bracket 19.

Having thus described a mechanism for carrying out the invention, which constitutes the preferred embodiment thereof, I wish it to be understood, and I believe it is plain, that various changes and modifications may be made in the particular details as described, without departing from the spirit of the invention, and within the scope and terms of the appended claims.

I claim:

1. A dirigible lighting apparatus for motor vehicles, including an upright rotatable post, a sleeve in which the post is journaled, having an outstanding ear, a tubular bracket in which the lower portion of the sleeve is journaled, lamp supporting means carried by the sleeve, said sleeve and said post having openings, a lever fulcrumed upon the said ear, an arm pivotally mounted on one end of the said lever and movable into the openings of the sleeve and post to connect the latter for simultaneous movement, the opposite end of said lever having an angular extremity, said tubular bracket having an aperture into which the angular extremity of said lever is movable, means for rotating the said post, lamp supporting means carried by the said sleeve, and means for shifting the said lever to render the lamp supporting means active and inactive.

2. The combination with a motor vehicle having a steering mechanism, of a dirigible lighting apparatus including connected lamps carried by the vehicle, vertical rotatable supports for the lamps, to which the latter are pivoted at their sides to move vertically with respect thereto, manual controlling means, connections between said lamp supports and the steering mechanism to move the former in consonance with the latter, means to adjust the lamps upon their side pivots, means to render the said steering connections active and inactive, each of said steering connections and lamp adjusting means being controlled by the manual controlling means, for the purpose described.

3. The combination with a motor vehicle having a steering mechanism, of a dirigible lighting apparatus including connected lamps, vertical rotatable supports to which the lamps are pivoted to swing in a vertical direction, means movable to connect the lamps with, and disconnect the same from, the said steering mechanism, means for shifting the lamps vertically upon their pivots, and manual controlling means for actuating the said means controlling the steering connection and also the lamp adjusting means.

JAMES M. CALKINS.

Witnesses:
ANNA M. SCOTT,
A. A. CALKINS.